(12) United States Patent
Frank

(10) Patent No.: US 9,590,708 B1
(45) Date of Patent: Mar. 7, 2017

(54) METHOD AND APPARATUS FOR EQUAL ENERGY CODEBOOKS FOR ANTENNA ARRAYS WITH MUTUAL COUPLING

(71) Applicant: MOTOROLA MOBILITY LLC, Chicago, IL (US)

(72) Inventor: Colin Frank, Park Ridge, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/855,693

(22) Filed: Sep. 16, 2015

Related U.S. Application Data

(60) Provisional application No. 62/209,405, filed on Aug. 25, 2015.

(51) Int. Cl.
| | | |
|---|---|---|
| *H04K 1/02* | (2006.01) | |
| *H04L 25/03* | (2006.01) | |
| *H04L 25/49* | (2006.01) | |
| *H04B 7/04* | (2006.01) | |

(52) U.S. Cl.
CPC ......... *H04B 7/0456* (2013.01); *H04B 7/0417* (2013.01); *H04B 7/0426* (2013.01)

(58) Field of Classification Search
CPC ............. H03F 1/3247; H03F 1/3294; H03F 2201/3233; H04L 27/368; H04L 25/03343
USPC ................................................ 375/295–297
See application file for complete search history.

(56) References Cited

U.S. PATENT DOCUMENTS

| | | | | |
|---|---|---|---|---|
| 7,181,246 B2* | 2/2007 | Lo | ......................... | H01Q 3/2605 370/252 |
| 7,551,907 B2* | 6/2009 | French | ................. | H03G 3/3078 370/332 |
| 7,804,917 B2* | 9/2010 | French | .................... | H04L 5/023 329/300 |
| 8,396,158 B2* | 3/2013 | Hugl | .................... | H04B 7/0617 375/260 |
| 8,498,358 B2* | 7/2013 | Clerckx | ............... | H04B 7/0417 341/173 |
| 2007/0286304 A1* | 12/2007 | Kim | ..................... | H04B 7/0452 375/267 |
| 2008/0080634 A1* | 4/2008 | Kotecha | ............... | H04B 7/0417 375/267 |

(Continued)

OTHER PUBLICATIONS

J. Wallace, M. Jensen, "Mutual Coupling in MIMO Wireless Systems: A Rigorous Network Theory Analysis," IEEE Transactions on Wireless Communications, Jul. 2004, p. 1317-1325.

(Continued)

*Primary Examiner* — James M Perez
(74) *Attorney, Agent, or Firm* — Matthew C. Loppnow; Watson Intellectual Property Group

(57) ABSTRACT

A method and apparatus provide equal energy codebooks for antenna arrays with mutual coupling. A plurality of precoders can be received from a codebook in a transmitter having an antenna array. Each precoder of the plurality of precoders can be transformed using a transformation that maps each precoder to equal radiated power to generate transformed precoders. A signal can be received for transmission. A transformed precoder of the plurality of transformed precoders can be applied to the signal to generate a precoded signal for transmission over a physical channel. The precoded signal can be transmitted.

17 Claims, 7 Drawing Sheets

(56) References Cited

U.S. PATENT DOCUMENTS

| | | | | |
|---|---|---|---|---|
| 2008/0112504 | A1* | 5/2008 | Jiang | H04L 1/0618 |
| | | | | 375/296 |
| 2010/0224725 | A1* | 9/2010 | Perlman | B60K 6/46 |
| | | | | 244/1 R |
| 2010/0248729 | A1* | 9/2010 | Yu | H04B 7/026 |
| | | | | 455/450 |
| 2010/0273495 | A1* | 10/2010 | Onggosanusi | H04B 7/024 |
| | | | | 455/450 |
| 2011/0002414 | A1* | 1/2011 | Coldrey | H04B 7/0426 |
| | | | | 375/296 |
| 2012/0140848 | A1* | 6/2012 | Lin | H04B 7/0691 |
| | | | | 375/296 |
| 2012/0307649 | A1* | 12/2012 | Park | H04B 7/0413 |
| | | | | 370/241 |
| 2013/0003788 | A1* | 1/2013 | Marinier | H04B 7/024 |
| | | | | 375/219 |
| 2013/0058296 | A1* | 3/2013 | Jitsukawa | H04W 72/0426 |
| | | | | 370/329 |
| 2013/0129014 | A1* | 5/2013 | Kim | H04B 7/0456 |
| | | | | 375/295 |
| 2013/0202015 | A1* | 8/2013 | Frank | H04B 7/0632 |
| | | | | 375/219 |
| 2016/0013843 | A1* | 1/2016 | Zhang | H04W 52/04 |
| | | | | 375/267 |

OTHER PUBLICATIONS

H. Steyskal, J. Herd, "Mutual coupling compensation in small array antennas," IEEE Transactions on Antennas and Propagation, Dec. 1990, pp. 1971-1975.

* cited by examiner

METHOD AND APPARATUS FOR EQUAL ENERGY CODEBOOKS FOR ANTENNA ARRAYS WITH MUTUAL COUPLING

BACKGROUND

1. Field

The present disclosure is directed to a method and apparatus for equal energy codebooks for antenna arrays with mutual coupling.

2. Introduction

Presently, wireless communication devices communicate with other communication devices using wireless signals. Many wireless communication devices have multiple antennas that can transmit more focused signals to a receiving device using antenna beamforming. Multiple telecommunication standards define antenna precoder codebooks to support antenna beamforming and or multiple-input/multiple output (MIMO) transmission with feedback from a receiver in the receiving device. Precoders from the codebooks apply a vector of complex amplitudes to a transmitted signal to provide for the antenna beamforming Telecommunication standards that employ codebooks of precoders include the 3GPP HSPA and LTE standards and the IEEE 802.11 and 802.16 standards. In all of these standards, the precoders that are defined have the property that each precoding vector has equal $L^2$ norm with the assumption that the precoders are applied to the antenna array in such a way that precoders having equal $L^2$ norm yield antenna patterns with equal radiated power in the far field. Here the $L^2$ norm (also known as the Euclidean norm) is defined as the square root of the sum of the square of the amplitudes so that for a vector x of length M $$x = (x_1 \; x_2 \; \ldots \; x_M)^T,$$

the $L^2$ or Euclidean norm is given by $$\left( \sum_{i=1}^{M} \|x_i\|^2 \right)^{\frac{1}{2}}$$

In each of the above telecommunication standards, precoders are used in combination with reference symbol transmissions so that the receiver can estimate and evaluate the quality of the channel that would result from application of each of the precoders. The receiver applies each of the precoders to the reference symbols in order to evaluate the channel quality. It then signals the index of the best precoder and the corresponding channel quality back to the transmitter. For some transmission modes, the precoder used for the data transmission is signaled from the transmitter to the receiver, and the receiver then applies the precoder to the channel estimates of the reference symbols in order to estimate the channel for the data symbols.

Implicit in the operation of these types of systems is the assumption that the precoders are applied in a manner such that the antenna pattern corresponding to each precoder has the same radiated power in the far field. The reason for this assumption is that it is the objective of the receiver to select the precoder which maximizes the channel quality, and thus the achievable data rate, for a given transmit power. In the case of a single user, this will maximize the transmission range of a fixed data rate, or alternatively, the achievable data rate at a fixed range. Alternatively, for multi-user systems, it is desirable to minimize the transmit power needed to achieve a given data rate for each user, as the transmit power for the target user is interference for all users other than the target user.

If there is no mutual coupling of the transmit array, then it will be true that antenna precoding vectors having equal $L^2$ norm will yield antenna patterns with equal power (some assumptions are necessary; e.g., such as the source impedances are equal and the antenna elements have equal self-impedance). However, if the antennas are coupled, then the antenna patterns resulting from two precoders having the same $L^2$ norm can differ in transmit power by several dB. The amount of this difference depends on multiple factors, including the mutual coupling coefficients, the type of sources used to drive the array, and the source impedances. Unfortunately, this difference results in a receiver making errors when evaluating channel quality from antenna arrays with mutual coupling.

Thus, there is a need for a method and apparatus for equal energy codebooks for antenna arrays with mutual coupling.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Embodiments provide a method and apparatus for equal energy codebooks for antenna arrays with mutual coupling. A plurality of precoders can be received from a codebook in a transmitter having an antenna array. Each precoder of the plurality of precoders can be transformed using a transformation that maps each precoder to a transformed precoder such the transformed precoders generate antenna patterns with equal radiated power. A signal can be received for transmission. A transformed precoder of the plurality of transformed precoders can be applied to the signal to generate a precoded signal for transmission over a physical channel. The precoded signal can be transmitted.

Figure 1:
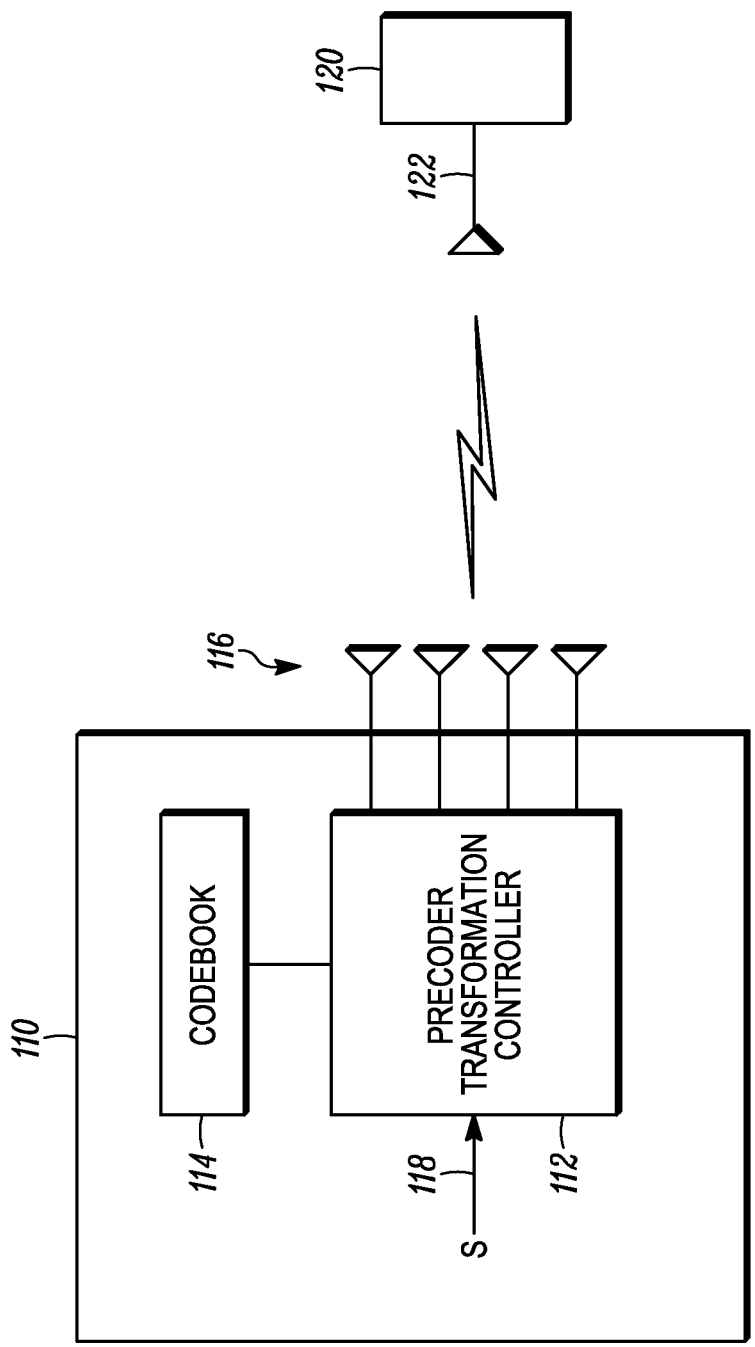
FIG. 1 is an example block diagram of a system according to a possible embodiment.

FIG. 1 is an example block diagram of a system 100 according to a possible embodiment. The system 100 can include a transmitting device 110 and a receiving device 120. The transmitting device 110 can be a User Equipment (UE), a base station, or any other device that can transmit wireless signals. Similarly, the receiving device 120 can be a UE, a base station, or any other device that can received wireless signals. A UE can be a wireless terminal, a portable wireless communication device, a smartphone, a cellular telephone, a flip phone, a personal digital assistant, a device having a subscriber identity module, a personal computer, a selective call receiver, a tablet computer, a laptop computer, or any other device that is capable of sending and receiving wireless communication signals.

The transmitting device 110 can include a precoder transformation controller 112, a codebook 114, and an antenna array 116. The precoder transformation controller 112 can be one element or can be distributed between different elements. For example, the precoder transformation controller 112 can be part of a processor, can be part of a transceiver, can be part of a precoder, can be part of other elements in a transmitting device, and/or can be distributed between combinations of elements in a transmitting device and/or over cloud computing. The receiving device 120 can include at least one antenna 122. For example, in some embodiments the receiving device 120 can have one antenna and in other embodiments the receiving device 120 can have an array of antennas.

In operation, the precoder transformation controller 112 can receive a plurality of precoders from the codebook 114 in the transmitting device 110 having the antenna array 116. The precoder transformation controller 112 can transform each precoder of the plurality of precoders using a transformation that maps each precoder to a transformed precoder such that the transformed precoders generate antenna patterns with equal radiated power. The precoder transformation controller 112 can receive a signal 118 for transmission. The precoder transformation controller 112 can apply a transformed precoder of the plurality of transformed precoders to the signal 118 to generate a precoded signal for transmission over a physical channel. The precoder transformation controller 112 can then transmit the precoded signal to the receiving device 120.

Figure 2:
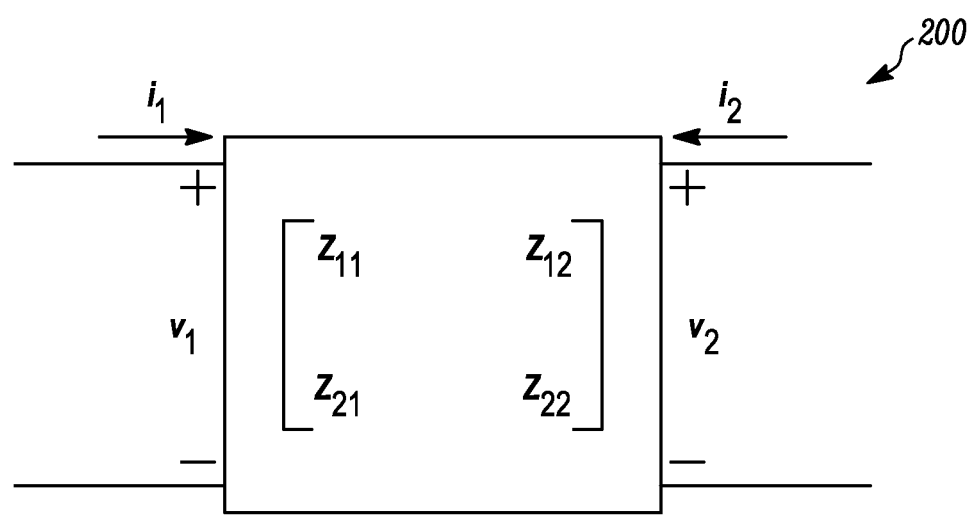
FIG. 2 is an example illustration of a two-port model for a two-element array according to a possible embodiment.

FIG. 2 is an example illustration of a two-port model 200 for a two-element array according to a possible embodiment. The two elements can correspond to two antennas in an antenna array. To determine the transformation, an M-port circuit can be used to model the vector voltage-current relationship for the M-ports of an M-element antenna array, which is given by $$v=Zi,$$

where Z is the M×M impedance matrix for the array. In the two-port model 200, $i_1$ and $v_1$ denote the current and voltage for a first antenna, while $i_2$ and $v_2$ denote the current and voltage for a second antenna, and $$v = \begin{bmatrix} v_1 \\ v_2 \end{bmatrix} \text{ and } i = \begin{bmatrix} i_1 \\ i_2 \end{bmatrix}.$$

Figure 3:
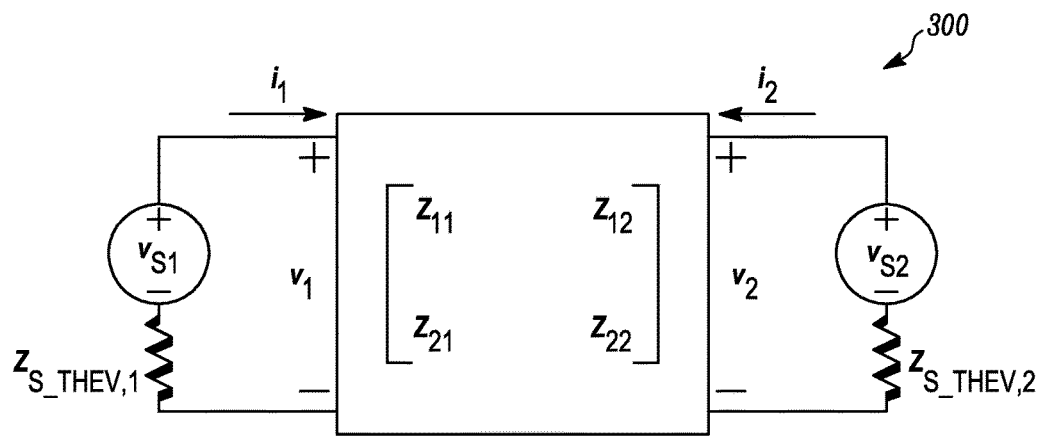
FIG. 3 is an example illustration of a Thevenin source model according to a possible embodiment.
Figure 4:
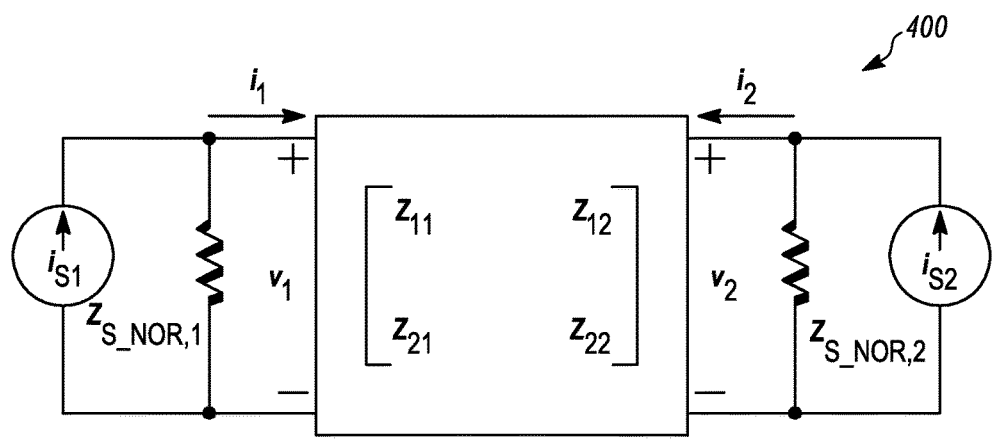
FIG. 4 is an example illustration of a Norton source model according to a possible embodiment.

FIG. 3 is an example illustration of a Thevenin source model 300 according to a possible embodiment. FIG. 4 is an example illustration of a Norton source model 400 according to a possible embodiment. The two linear source models can be considered for driving the antenna array. In general, the circuits used to drive each element of the antenna array can be modeled as a Thevenin source or as a Norton source. The Thevenin source model is used in the case that antenna precoders are applied as voltages, and the Norton source is applied in the case that the antenna precoders are applied as current sources. The Thevenin source can include an ideal vector voltage source $v_S$ in combination with a series impedance $Z_{S\_Thev}$, where $Z_{S\_Thev}$ is a diagonal matrix with diagonal elements equal to the series impedance for each voltage source. The Norton source can include an ideal vector current source $i_S$ in combination with a parallel shunt impedance $Z_{S\_Nor}$, where $Z_{S\_Nor}$ is a diagonal matrix with diagonal elements equal to the shunt impedance for each current source. It can be noted that the Norton source will yield two-port currents i and voltages v which are equal to that for the Thevenin source so long as $$Z_{S\_Thev}=Z_{S\_Nor} \text{ and } v_S=Z_{S\_Thev}i_S$$

where $$v_s = \begin{bmatrix} v_{S1} \\ v_{S2} \end{bmatrix} \quad Z_{S\_Thev} = \begin{bmatrix} Z_{S\_Thev,1} & 0 \\ 0 & Z_{S\_Thev,2} \end{bmatrix}$$

and $$i_s = \begin{bmatrix} i_{S1} \\ i_{S2} \end{bmatrix} \quad Z_{S\_Nor} = \begin{bmatrix} Z_{S\_Nor,1} & 0 \\ 0 & Z_{S\_Nor,2} \end{bmatrix}.$$

For an M-element array, the peak radiated power (average power is one-half of peak) is equal to the power delivered to the M-port device and is given by $$Re(v^H i)=Re(i^H Z^H i)$$

where Z is the impedance matrix and i is the vector of input currents.

For the Thevenin source model 300 with source voltage $v_S$ and source impedance $Z_{S\_Thev}$, the current vector at the input to the two-port device is given by $$i=(Z_{S\_Thev}+Z)^{-1}v_S.$$

Thus, the radiated power for the Thevenin source is given by $$P_{rad\_Thev}(v_S,Z_{S\_Thev},Z)=Re(((Z_{S\_Thev}+Z)^{-1}v_S)^H Z((Z_{S\_Thev}+Z)^{-1}v_S))=Re(v_S^H (Z_{S\_Thev}+Z)^{-H} Z(Z_{S\_Thev}+Z)^{-1}v_S).$$

This expression can be further simplified as $$P_{rad\_thev}(v_S, Z_{S\_Thev}, Z) = \frac{1}{2}\left( \begin{array}{l} v_S^H(Z_{S\_Thev} + Z)^{-H} Z(Z_{S\_Thev} + Z)^{-1} v_S + \\ \left(v_S^H(Z_{S\_Thev} + Z)^{-H} Z(Z_{S\_Thev} + Z)^{-1} v_S\right)^H \end{array} \right)$$

$$= \frac{1}{2}\left(v_S^H(Z_{S\_Thev} + Z)^{-H}(Z + Z^H)(Z_{S\_Thev} + Z)^{-1} v_S\right)$$

$$= v_S^H((Z_{S\_Thev} + Z)^{-H}\text{Re}(Z)(Z_{S\_Thev} + Z)^{-1})v_S$$

$$= v_S^H Q_{Thev} v_S$$

where $$Q_{Thev}=(Z_{S\_Thev}+Z)^{-H} Re(Z)(Z_{S\_Thev}+Z)^{-1}.$$

Here we have used the fact that for passive linear networks $$Z=Z^T$$

and thus $$\frac{Z+Z^H}{2} = \frac{Z+(Z^T)^*}{2} = \frac{Z+Z^*}{2} = \text{Re}(Z).$$

For the Norton source model 400 with source currents $i_S$ and source impedance $Z_{S\_Nor}$, the antenna currents are given by $$i = Z^{-1}(Z_{S\_Nor}^{-1} + Z^{-1})^{-1} i_S,$$

where Z is the impedance matrix for the array. If it is again assumed that all of the power delivered to the array is radiated (i.e., no ohmic or other losses), the radiated power for the Norton source is given by $$P_{rad\_Nor\_circuit}(i_S, Z_{S\_Nor}, Z) = \text{Re}(i_S^H(Z_{S\_Nor}^{-1} + Z^{-1})^{-H} Z^{-H} Z Z^{-1}(Z_{S\_Nor}^{-1} + Z^{-1})^{-1} i_S) = \text{Re}(i_S^H Z_{S\_Nor}^H(Z_{S\_Nor} + Z)^{-H} Z(Z_{S\_Nor} + Z)^{-1} Z_{S\_Nor} i_S).$$

It can be noted that if that if the Norton source is equivalent to the Thevenin source in the previous section, then $$Z_{S\_Nor} i_S = v_S \text{ and } Z_{S\_Nor} = Z_{S\_Thev}$$

and the radiated power is given by $$P_{rad\_Nor\_circuit}(i_S, Z_{S\_Nor}, Z) = \text{Re}(i_S^H Z_{S\_Nor}^H (Z_{S\_Nor} + Z)^{-H} Z(Z_{S\_Nor} + Z)^{-1} Z_{S\_Nor} i_S) = \text{Re}(v_S^H (Z_{S\_Thev} + Z)^{-H} Z(Z_{S\_Thev} + Z)^{-1} v_S),$$

which is the same as for the Thevenin source model.

As in the case of the Thevenin source model, the expression for radiated power can be simplified as $$P_{rad\_Nor\_circuit}(i_S, Z_{S\_Nor}, Z) = \frac{1}{2} \begin{pmatrix} i_S^H Z_{S\_Nor}^H (Z_{S\_Nor} + Z)^{-H} Z(Z_{S\_Nor} + Z)^{-1} \\ Z_{S\_Nor} i_S + (i_S^H Z_{S\_Nor}^H (Z_{S\_Nor} + Z)^{-H} \\ Z(Z_{S\_Nor} + Z)^{-1} Z_{S\_Nor} i_S)^H \end{pmatrix}$$

$$= \frac{1}{2} (i_S^H Z_{S\_Nor}^H (Z_{S\_Nor} + Z)^{-H} (Z + Z^H)(Z_{S\_Nor} + Z)^{-1} Z_{S\_Nor} i_S)$$

$$= i_S^H (Z_{S\_Nor}^H (Z_{S\_Nor} + Z)^{-H} \text{Re}(Z)(Z_{S\_Nor} + Z)^{-1} Z_{S\_Nor}) i_S$$

$$= i_S^H Q_{Nor} i_S$$

where $$Q_{Nor} = Z_{S\_Nor}^H (Z_{S\_Nor} + Z)^{-H} \text{Re}(Z)(Z_{S\_Nor} + Z)^{-1} Z_{S\_Nor}.$$

For unit energy precoders with coupled antennas, it has now been established that regardless of whether the precoder is implemented as a vector voltage source (in a Thevenin source) or as a vector current source (in a Norton source), the radiated power can be expressed in quadratic form. In particular, for a Thevenin source, the radiated power can be expressed as $$P_{rad\_Thev}(v_S, Z_{S\_Thev}, Z) = v_S^H Q_{Thev} v_S$$

where $$Q_{Thev} = (Z_{S\_Thev} + Z)^{-H} \text{Re}(Z)(Z_{S\_Thev} + Z)^{-1}.$$

Similarly, for a Norton source, the radiated power can be expressed as $$P_{rad\_Nor\_circuit}(i_S, Z_{S\_Nor}, Z) = i_S^H Q_{Nor} i_S$$

where $$Q_{Nor} = Z_{S\_Nor}^H (Z_{S\_Nor} + Z)^{-H} \text{Re}(Z)(Z_{S\_Nor} + Z)^{-1} Z_{S\_Nor}.$$

The problem with both of these quadratic forms is that precoders with equal $L^2$ norm do not map to equal energy antenna patterns. To demonstrate this point, we consider the case of two half-wavelength dipoles separated by one-half wavelength. The impedance matrix for this array is given by $$Z = \begin{bmatrix} 73 + j \cdot 42.5 & -13 - j \cdot 25 \\ -13 - j \cdot 25 & 73 + j \cdot 42.5 \end{bmatrix}.$$

Figure 5:
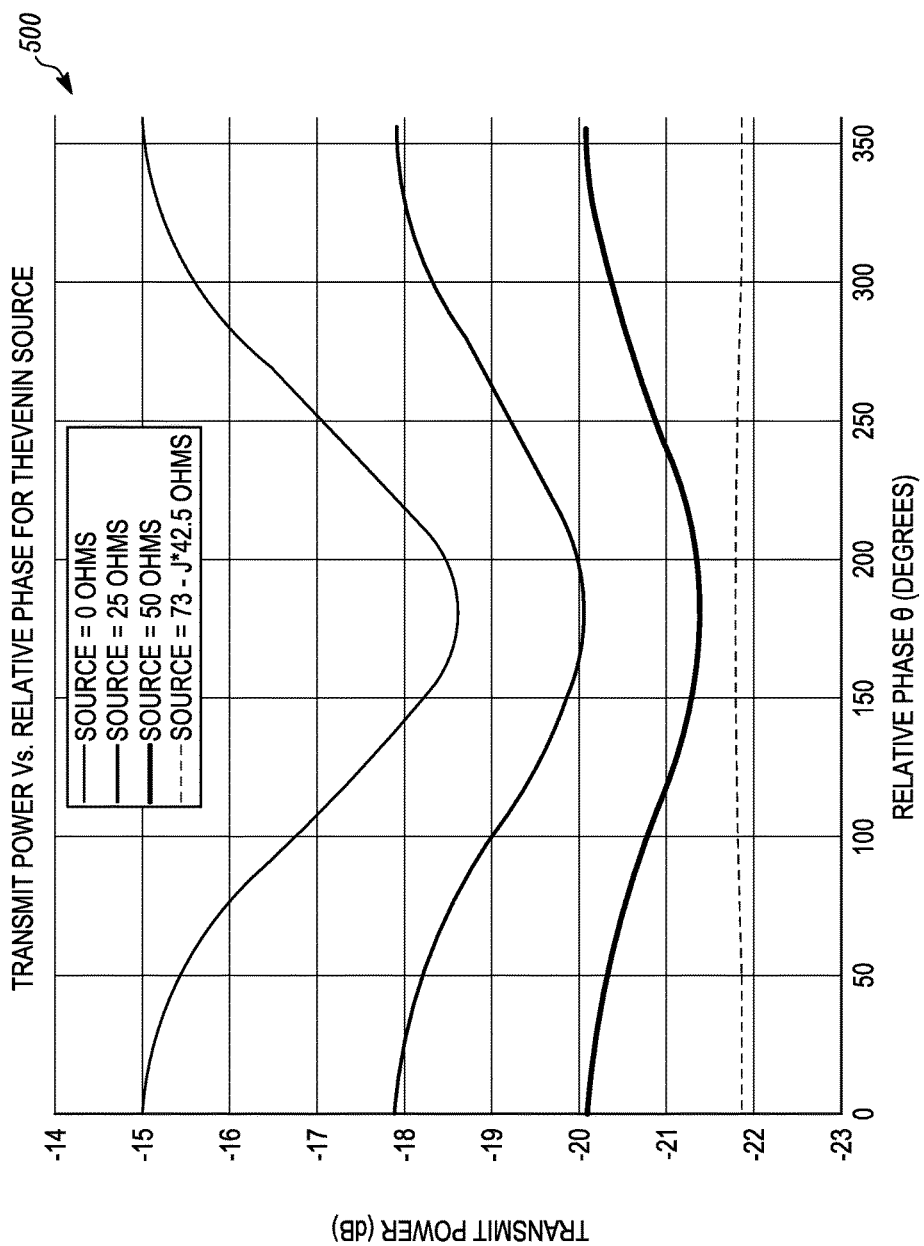
FIG. 5 is an example graph illustrating transmitter power vs. relative phase offset for a Thevenin source model according to a possible embodiment

FIG. 5 is an example graph 500 illustrating transmitted power vs. relative phase offset for a Thevenin source model according to a possible embodiment. Consider the Thevenin source with a precoder of the form $v(\theta) = [1 \ \exp(j\theta)]^T$, and note that the $L^2$ norm of the precoder $v(\theta)$ is independent of the phase $\theta$, so that $$\|v(\theta)\|^2 = 2$$

for all $\theta$. The radiated power for this precoder is shown in the graph 500 as a function of the relative phase $\theta$ and the source impedance $Z_{S\_Thev}$, for source impedances of 0, 25, 50 and 73-j42 ohms. It can be observed that for a source impedance of 0, the transmitted power varies by 3.7 dB even as the $L^2$ norm of the precoder is held constant.

Figure 6:
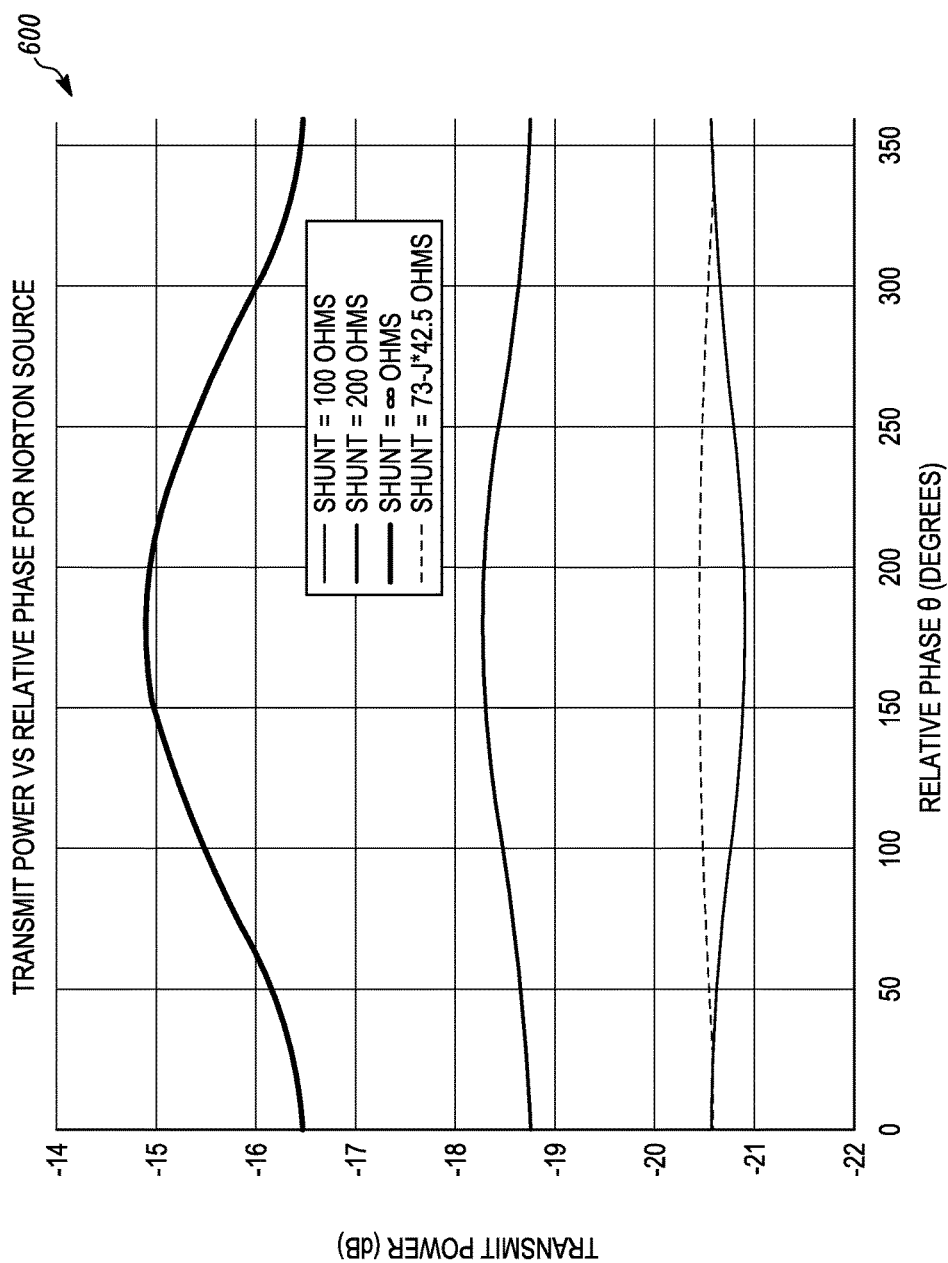
FIG. 6 is an example graph illustrating transmitter power vs. relative phase offset for a Norton source model according to a possible embodiment.

FIG. 6 is an example graph 600 illustrating transmitter power vs. relative phase offset for a Norton source model according to a possible embodiment. Consider the Norton source with a precoder of the form $i(\theta) = [1 \ \exp(j\theta)]^T$, and note that the $L^2$ norm of the precoder $i(\theta)$ is independent of the phase $\theta$, so that $$\|i(\theta)\|^2 = 2$$

for all $\theta$. The radiated power for this precoder is shown in the graph 600 as a function of the relative phase $\theta$ and the source impedance $Z_{S\_Thev}$, for source impedances of 100, 200, $\infty$, and 73-j42 ohms. It can be observed that for infinite source impedance ($\infty$), the transmitted power varies by 1.5 dB even as the $L^2$ norm of the precoder is held constant.

So, in summary, even if the $L^2$ norm of the precoder is held constant, the transmitted power can vary by several dB, and in particular, can vary by 3.7 dB for a Thevenin source with zero impedance and can vary by 1.5 dB for a Norton source with infinite source impedance.

As noted previously, there is a need for the system to have the precoders map to equal energy antenna patterns. All of the standards have already defined precoders with equal $L^2$ norms, so it is highly desirable to find a way to use the antenna precoders which have already been defined. Furthermore, it is simply not practical to define a new set of antenna precoders for each possible antenna array configuration (and associated coupling and impedance parameters), and source model (Thevenin or Norton, with associated source impedance).

The transmitted power can vary quite significantly over the codebook. Embodiments provide a solution to the problem of transmitter power variation over the precoder codebook by transforming the precoders to transformed precoders which map to antenna patterns with equal radiated power, and which does not require additional signaling to inform the receiver of the precoder transformation used at the transmitter. Embodiments further provide a method for mapping the existing precoders which have already been defined in the standards (IEEE 802.11 and 802.16, and 3GPP HSPA and LTE standards) into equal energy precoders. The proposed method has multiple advantages. One advantage is that the proposed method can use existing precoders.

Another advantage is that the proposed method still allows precoder based channel estimation and channel quality evaluation. Another advantage is that the proposed method does not require signaling of the precoder transformation used at the transmitter.

In order to describe the method, we first consider the case of the Thevenin source for which the radiated power is given by $$P_{rad\_Thev}(v_S, Z_{S\_Thev}, Z) = v_S^H Q_{Thev} v_S.$$

Since the M×M matrix $Q_{Thev}$ is positive definite, it can be expressed as $$Q_{Thev} = P_{Thev}^H P_{Thev}$$

where we refer to $P_{Thev}^H$ and $P_{Thev}$ as the left and right factors of the product. Now define $$v_S = P_{Thev}^{-1} w$$

and note that $$v_S^H Q_{Thev} v_S = w^H P_{Thev}^{-H} Q_{Thev} P_{Thev}^{-1} w = w^H P_{Thev}^{-H} P_{Thev}^H P_{Thev} P_{Thev}^{-1} w = w^H w = \|w\|_2^2$$

Thus, if each precoder w is transformed into a voltage vector $v_S$ using the transformation $v_S = P_{Thev}^{-1} w$, all of the precoders will map to equal energy patterns so long as all of the precoders have the same $L^2$ norm.

In order for these precoders to be used for precoder-based channel estimation and channel quality evaluation at the receiver, the antenna patterns that must be linear with respect to the precoders. Thus, if a first precoder $w_1$ produces antenna pattern $q_{w_1}(\theta,\phi)$ and precoder $w_2$ produces antenna pattern $q_{w_2}(\theta,\phi)$, then it must be true that the precoder $\alpha w_1 + \beta w_2$ produces the antenna pattern $\alpha q_{w_1}(\theta,\phi) + \beta q_{w_2}(\theta,\phi)$, where $\alpha$ and $\beta$ are complex scalar constants. Thus, so long as the reference symbol precoders, both cell-specific reference symbols (CRS) and channel state information reference symbols (CSI-RS), use the same transformation as the data symbol precoders, the receiver can use the existing precoders to estimate the channel, and the receiver does not need to know the precoder transformation that was used at the transmitter.

For the Thevenin source model, the antenna pattern resulting from the application of precoder $w_1$ is given by $$q_{w_1}(\theta,\phi) = v_1^T (Z_{S\_Thev} + Z)^{-1} p(\theta,\phi) = w_1^T P_{Thev}^{-T} (Z_{S\_Thev} + Z)^{-1} p(\theta,\phi)$$

where $p(\theta,\phi)$ is the vector of antenna element patterns in isolation from each other. Similarly, the antenna pattern resulting from precoder $w_2$ is given by $$q_{w_2}(\theta,\phi) = v_2^T (Z_{S\_Thev} + Z)^{-1} p(\theta,\phi) = w_2^T P_{Thev}^{-T} (Z_{S\_Thev} + Z)^{-1} p(\theta,\phi).$$

Finally, the antenna pattern resulting from precoder $\alpha w_1 + \beta w_2$ is given by $$q_{\alpha w_1 + \beta w_2}(\theta,\phi) = (\alpha v_1 + \beta v_2)^T (Z_{S\_Thev} + Z)^{-1} p(\theta,\phi) = (\alpha w_1^T + \beta w_2^T) P_{Thev}^{-T} (Z_{S\_Thev} + Z)^{-1} p(\theta,\phi) = \alpha w_1^T P_{Thev}^{-T} (Z_{S\_Thev} + Z)^{-1} p(\theta,\phi) + \beta w_2^T P_{Thev}^{-T} (Z_{S\_Thev} + Z)^{-1} p(\theta,\phi) = \alpha q_{w_1}(\theta,\phi) + \beta q_{w_2}(\theta,\phi)$$

and thus the precoders have the linearity property needed for precoder-based channel evaluation at the receiver.

We now consider the Norton source for which the radiated power is given by $$P_{rad\_Nor\_circuit}(i_{S\_Nor}, Z) = i_S^H Q_{Nor} i_S.$$

Since the M×M matrix $Q_{Nor}$ is positive definite, it can be expressed as $$Q_{Nor} = P_{Nor}^H P_{Nor}$$

where we refer to $P_{Nor}^H$ and $P_{Nor}$ as the left and right factors of the product. Now define $$i_S = P_{Nor}^{-1} w$$

and note that $$i_S^H Q_{Nor} i_S = w^H P_{Nor}^{-H} Q_{Nor} P_{Nor}^{-1} w = w^H P_{Nor}^{-H} P_{Nor}^H P_{Nor} P_{Nor}^{-1} w = w^H w = \|w\|_2^2$$

Thus, if each precoder w is transformed into a current vector $i_S$ using the transformation $i_S = P_{Nor}^{-1} w$, all of the precoders will map to unit energy.

In order for these precoders to be used for precoder-based channel estimation channel quality evaluation at a receiver, the antenna patterns that must be linear with respect to the precoders. Thus, if a first precoder $w_1$ produces antenna pattern $q_{w_1}(\theta,\phi)$ and precoder $w_2$ produces antenna pattern $q_{w_2}(\theta,\phi)$, then it must be true that the precoder $\alpha w_1 + \beta w_2$ produces the antenna pattern $\alpha q_{w_1}(\theta,\phi) + \beta q_{w_2}(\theta,\phi)$, where $\alpha$ and $\beta$ are complex scalar constants.

For the Norton source model, the antenna pattern resulting from the application of precoder $w_1$ is given by $$q_{w_1}(\theta,\phi) = i_1^T (Z_{S\_Nor} + Z)^{-1} p(\theta,\phi) = w_1^T P_{Nor}^{-T} (Z_{S\_Nor} + Z)^{-1} p(\theta,\phi)$$

where $p(\theta,\phi)$ is the vector of antenna element patterns in isolation from each other. Similarly, the antenna pattern resulting from precoder $w_2$ is given by $$q_{w_2}(\theta,\phi) = i_2^T (Z_{S\_Nor} + Z)^{-1} p(\theta,\phi) = w_2^T P_{Nor}^{-T} (Z_{S\_Nor} + Z)^{-1} p(\theta,\phi).$$

Finally, the antenna pattern resulting from precoder $\alpha w_1 + \beta w_2$ is given by $$q_{\alpha w_1 + \beta w_2}(\theta,\phi) = (\alpha i_1 + \beta i_2)^T (Z_{S\_Nor} + Z)^{-1} p(\theta,\phi) = (\alpha w_1^T + \beta w_2^T) P_{Nor}^{-T} (Z_{S\_Nor} + Z)^{-1} p(\theta,\phi) = \alpha w_1^T P_{Nor}^{-T} (Z_{S\_Nor} + Z)^{-1} p(\theta,\phi) + \beta w_2^T P_{Nor}^{-T} (Z_{S\_Nor} + Z)^{-1} p(\theta,\phi) = \alpha q_{w_1}(\theta,\phi) + \beta q_{w_2}(\theta,\phi)$$

and thus the precoders have the linearity property needed for precoder-based channel evaluation at the receiver.

Thus, so long as the reference symbol precoders use the same transformation as the data symbol precoders, the receiver can use the existing precoders to estimate the channel, and the receiver does not need to know the precoder transformation that was used at the transmitter.

Figure 7:
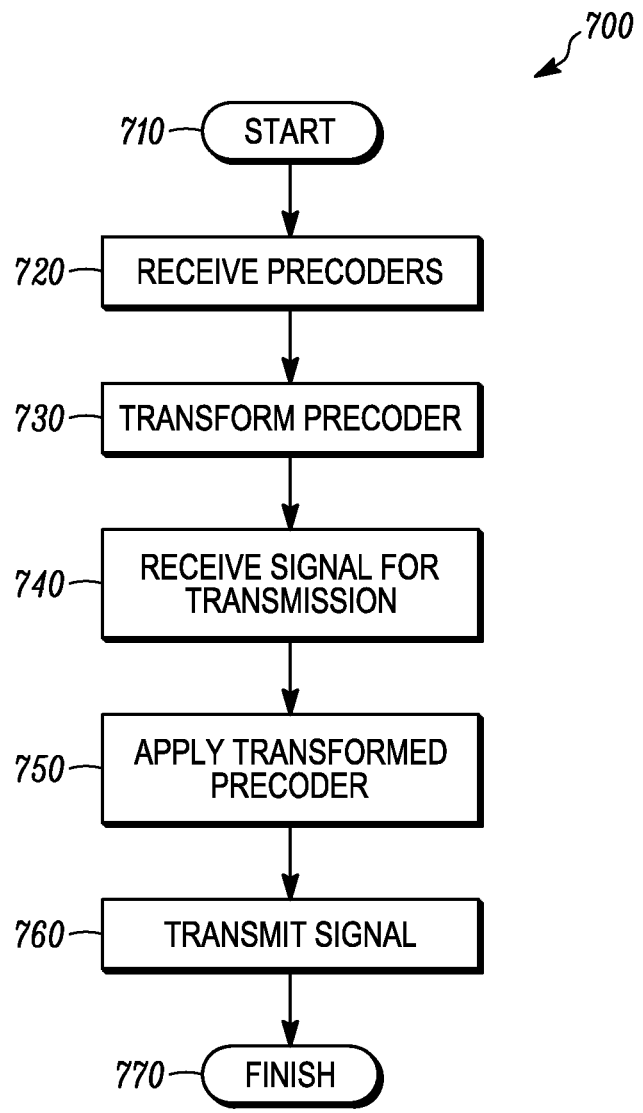
FIG. 7 is an example flowchart illustrating the operation of a wireless communication device according to a possible embodiment.

FIG. 7 is an example flowchart 700 illustrating the operation of a wireless communication device, such as the transmitting device 110, according to a possible embodiment. The method of the flowchart 700 can be performed in a UE, in an eNB, or in any other device that uses precoders and has a transmitter. At 710, the flowchart 700 can begin.

At 720, a plurality of precoders can be received from a codebook in a transmitter having an antenna array. The antennas of the array can be mutually coupled in that voltage or current applied to one antenna element can induce a voltage or current on another antenna element in the antenna array. A precoder can be a reference symbol precoder or a data symbol precoder. Also, a precoder can be a vector or a matrix. The precoders can be received by a transmitting device, can be received by a controller in a transmitting device, can be received by a precoder unit in a transmitting device, can be received from a network entity, can be received from memory, and/or can be otherwise received at any useful element in a transmitting device and from any element that can provide precoders from a codebook.

At 730, each precoder of the plurality of precoders can be transformed using a transformation that maps each precoder to a transformed precoder such the transformed precoders generate antenna patterns with equal radiated power. Both data symbol precoders and reference symbol precoders can be transformed by the same transformation. The transformation can map each precoder to a transformed precoder such the transformed precoders generate antenna patterns with equal radiated power from the antenna array. A transformation matrix for the transformation can be an inverse of a right factor of a factorization of a Hermitian and non-negative definite matrix. According to a possible embodiment, the Hermitian and non-negative definite matrix can be a function of a source model of a transmitter of the transmitting device, a source impedance of the transmitter, an impedance matrix of the antenna array, and/or other information.

According to a possible implementation, the transmitter can include a transmitter source and the transformation can include $$v = P_{Thev}^{-1} w$$

where w can be the precoder from the codebook, v can be the transformed precoder, and $P_{Thev}$ can be based on $$Q_{Thev} = P_{Thev}^{H} P_{Thev}$$

where $$Q_{Thev} = (Z_{S\_Thev} + Z)^{-H} Re(Z)(Z_{S\_Thev} + Z)^{-1},$$

where $Z_{S\_Thev}$ can be a diagonal matrix of the transmitter source impedances and Z is the impedance matrix of the antenna array.

According to another possible implementation, the transmitter can include a transmitter source and the transformation can include $$i = P_{Nor}^{-1} w$$

where w can be the precoder from the codebook, i can be the transformed precoder, and $P_{Nor}$ can be based on $$Q_{Nor} = P_{Nor}^{H} P_{Nor}$$

where $$Q_{Nor} = Z_{S\_Nor}^{H} (Z_{S\_Nor} + Z)^{-H} Re(Z)(Z_{S\_Nor} + Z)^{-1} Z_{S\_Nor},$$

where $Z_{S\_Nor}$ can be a diagonal matrix of the transmitter source impedances and Z can be the impedance matrix of the antenna array.

At 740, a signal can be received for transmission. The signal can be a reference symbol or data symbol. At 750, a transformed precoder of the plurality of transformed precoders can be applied to the signal to generate a precoded signal for transmission over a physical channel. Applying can include multiplying the transformed precoder of the plurality of transformed precoders by the signal to generate a precoded signal for transmission over the physical channel. At 760, the precoded signal can be transmitted. At 770, the flowchart 700 can end.

Some example embodiments above describe a two-port model for a two-element antenna array, and more generally, an M-port model for an M-element antenna array. In these example embodiments, impedance parameters (Z matrix) model the relationship of the voltages and the currents for this two-port, or M-port, antenna array as $$v = Zi.$$

There are also other equivalent parameters that can be used to model the antenna array. For example, other sets of parameters can include admittance parameters (Y), hybrid parameters (H), inverse hybrid parameters (G), ABCD parameters (ABCD), scattering parameters (S), scattering transfer parameters (T), and other parameters useful for modeling an antenna array. All of these models are equivalent, even if they look slightly different. For example, the admittance parameters (Y) can have the voltage- current relationship of $$i = Yv$$

so that $$v = Y^{-1} i$$

and thus $$Z = Y^{-1}.$$

The last expression can give the relationship between the impedance parameters and the admittance parameters. Thus, if the antenna array is represented in terms of its admittance parameters, the precoder transformation may look slightly different, but is still equivalent to the transformation with the impedance parameters. For example, the transformation can be exactly the same with the exact same or similar mapping of a precoder to a transformed precoder, except that Z can be replaced everywhere by $Y^{-1}$, and these can be exactly equal. Similarly, all the other parameters cases above can be converted to Z parameters and are thus equivalent.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 8:
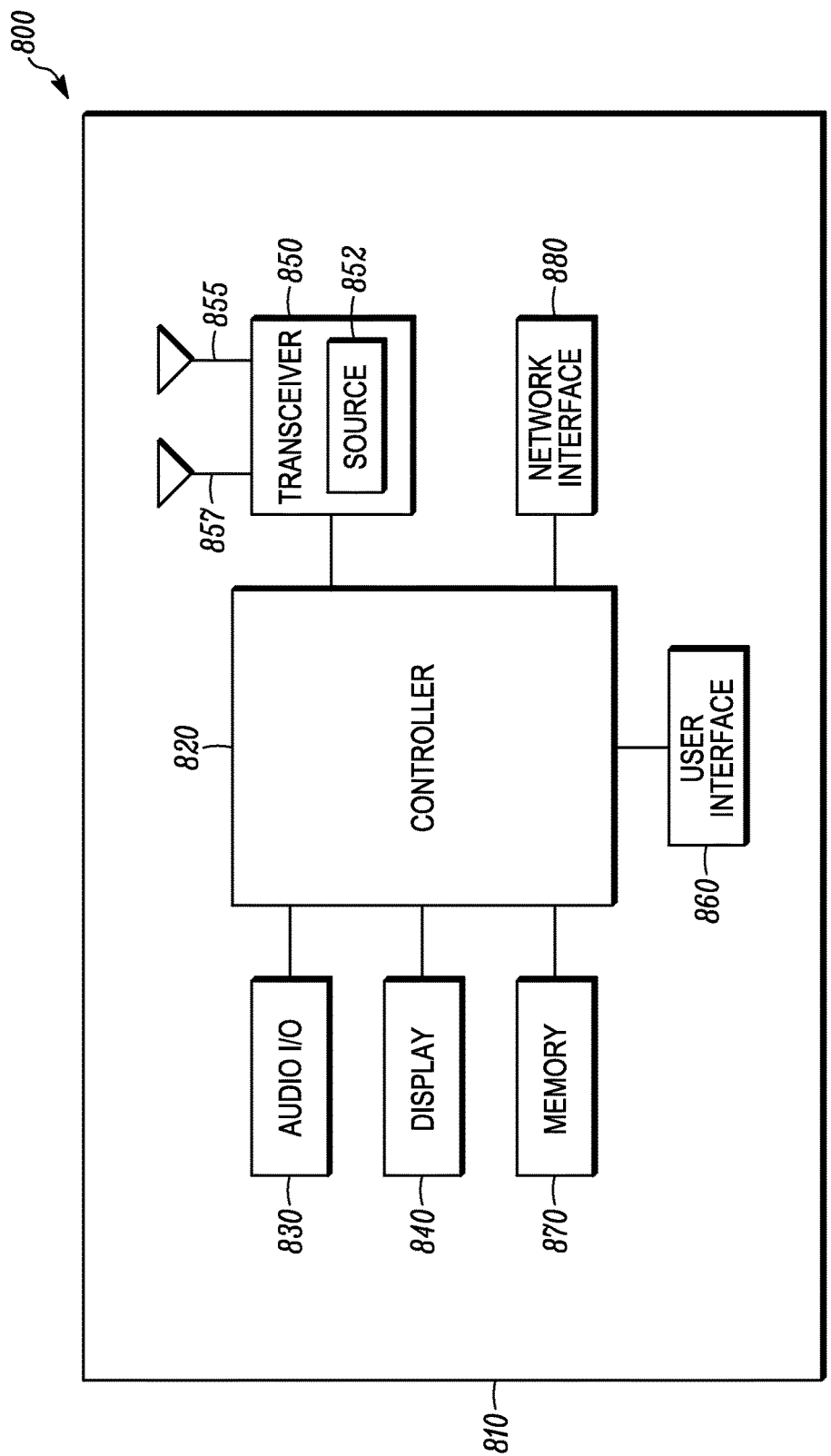
FIG. 8 is an example block diagram of an apparatus according to a possible embodiment.

FIG. 8 is an example block diagram of an apparatus 800, such as the transmitting device 110, according to a possible embodiment. The apparatus 800 can be a base station, a UE, or any other transmitting apparatus. The apparatus 800 can include a housing 810, a controller 820 within the housing 810, audio input and output circuitry 830 coupled to the controller 820, a display 840 coupled to the controller 820, a transceiver 850 coupled to the controller 820, an antenna array including plurality of antennas, such as antennas 855 and 857, coupled to the transceiver 850, a user interface 860 coupled to the controller 820, a memory 870 coupled to the controller 820, and a network interface 880 coupled to the controller 820. The apparatus 800 can perform the methods described in all the embodiments.

The display 840 can be a viewfinder, a liquid crystal display (LCD), a light emitting diode (LED) display, a plasma display, a projection display, a touch screen, or any other device that displays information. The transceiver 850 can include a transmitter and/or a receiver. The plurality of antennas 855 and 857 can include two or more antennas. The antennas 855 and 857 can be mutually coupled in that voltage or current applied to one antenna element induces a voltage or current on another antenna element in the antenna array. The audio input and output circuitry 830 can include a microphone, a speaker, a transducer, or any other audio input and output circuitry. The user interface 860 can include a keypad, a keyboard, buttons, a touch pad, a joystick, a touch screen display, another additional display, or any other device useful for providing an interface between a user and an electronic device. The network interface 880 can be a Universal Serial Bus (USB) port, an Ethernet port, an infrared transmitter/receiver, an IEEE 1398 port, a WLAN transceiver, or any other interface that can connect an apparatus to a network, device, or computer and that can transmit and receive data communication signals. The memory 870 can include a random access memory, a read only memory, an optical memory, a flash memory, a removable memory, a hard drive, a cache, or any other memory that can be coupled to a wireless communication device.

The apparatus 800 or the controller 820 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 870 or elsewhere on the apparatus 800. The apparatus 800 or the controller 820 may also use hardware to implement disclosed operations. For example, the controller 820 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 820 may be any controller or processor device or devices capable of operating a wireless communication device and implementing the disclosed embodiments. While the controller 820 is illustrated as one block and operations of the controller 820 can be performed in one element, the controller 820 can alternately be distributed between different elements of the apparatus 800 as well as distributed through cloud computing.

In operation, the memory 870 can store a codebook including a plurality of precoders. The controller 820 can receive a plurality of precoders from the codebook in the memory 870. The controller 820 can transform each precoder of the plurality of precoders using a transformation that maps each precoder to a transformed precoder such the transformed precoders generate antenna patterns with equal radiated power. The transformation can map each precoder to a transformed precoder such the transformed precoders generate antenna patterns with radiated power from the antenna array. The same transformation can be applied to data symbol precoders and reference symbol precoders. A transformation matrix for the transformation can be an inverse of a right factor of a factorization of a Hermitian and non-negative definite matrix. Furthermore, the Hermitian and non-negative definite matrix can be a function of a source model of the transmitter, a source impedance of the transmitter, an impedance matrix of the antenna array, and/or other information.

According to a possible embodiment, the transceiver 850 can include a transmitter source 852 and the transformation can include $$v = P_{Thev}^{-1} w$$

where w can be the precoder from the codebook, v can be the transformed precoder, and $P_{Thev}$ can be based on $$Q_{Thev} = P_{Thev}^H P_{Thev}$$

where $$Q_{Thev} = (Z_{S\_Thev} + Z)^{-H} Re(Z)(Z_{S\_Thev} + Z)^{-1}$$

where $Z_{S\_Thev}$ can be a diagonal matrix of the transmitter source impedances and Z can be the impedance matrix of the antenna array.

According to another possible embodiment, the transformation can include $$i = P_{Nor}^{-1} w$$

where w can be the precoder from the codebook, i is the transformed precoder, and $P_{Nor}$ can be based on $$Q_{Nor} = P_{Nor}^H P_{Nor}$$

where $$Q_{Nor} = Z_{S\_Nor}^H (Z_{S\_Nor} + Z)^{-H} Re(Z)(Z_{S\_Nor} + Z)^{-1} Z_{S\_Nor}$$

where $Z_{S\_Nor}$ is a diagonal matrix of the transmitter source impedances and Z is the impedance matrix of the antenna array.

The controller 820 can receive a signal for transmission. The signal can be a reference signal or a data signal. The controller 820 can apply a transformed precoder of the plurality of transformed precoders to the signal to generate a precoded signal for transmission over a physical channel. The controller 820 can apply a transformed precoder by multiplying the transformed precoder by the signal to generate a precoded signal for transmission over a physical channel. The transceiver 850 can transmit the precoded signal.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including,"

"having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

I claim:

1. A method comprising:
   receiving a plurality of precoders from a codebook in a transmitter having an antenna array;
   transforming each precoder of the plurality of precoders using a transformation that maps each precoder to a transformed precoder such that the transformed precoders generate antenna patterns with equal radiated power;
   receiving a signal for transmission;
   applying a transformed precoder of the plurality of transformed precoders to the signal to generate a precoded signal for transmission over a physical channel; and
   transmitting the precoded signal,
   wherein a transformation matrix for the transformation is an inverse of a right factor of a factorization of a Hermitian and non-negative definite matrix.

2. The method according to claim 1, wherein the transformation maps each precoder to a transformed precoder such the transformed precoders generate antenna patterns with equal radiated power from the antenna array.

3. The method according to claim 1 wherein the Hermitian and non-negative definite matrix is a function of a source model of the transmitter, a source impedance of the transmitter, and an impedance matrix of the antenna array.

4. The method according to claim 3,
   wherein the transmitter includes a transmitter source, and wherein the transformation comprises:

$$v = P_{Thev}^{-1} w$$

where w is the precoder from the codebook, v is the transformed precoder, and $P_{Thev}$ is based on $$Q_{Thev} = P_{Thev}^H P_{Thev}$$

where $$Q_{Thev} = (Z_{S\_Thev}+Z)^{-H} Re(Z)(Z_{S\_Thev}+Z)^{-1}$$

where $Z_{S\_Thev}$ is a diagonal matrix of the transmitter source impedances and Z is the impedance matrix of the antenna array.

5. The method according to claim 3,
   wherein the transmitter includes a transmitter source, and wherein the transformation comprises:

$$i = P_{Nor}^{-1} w$$

where w is the precoder from the codebook, i is the transformed precoder, and $P_{Nor}$ is based on $$Q_{Nor} = P_{Nor}^H P_{Nor}$$

where $$Q_{Nor} = Z_{S\_Nor}^H (Z_{S\_Nor}+Z)^{-H} Re(Z)(Z_{S\_Nor}+Z)^{-1} Z_{S\_Nor}$$

where $Z_{S\_Nor}$ is a diagonal matrix of the transmitter source impedances and Z is the impedance matrix of the antenna array.

6. The method according to claim 1, wherein applying comprises multiplying the transformed precoder of the plurality of transformed precoders by the signal to generate a precoded signal for transmission over a physical channel.

7. The method according to claim 1, wherein both data symbol precoders and reference symbol precoders are transformed by the same transformation.

8. The method according to claim 1, wherein the antennas of the array are mutually coupled in that voltage or current applied to one antenna element induces a voltage or current on another antenna element in the antenna array.

9. An apparatus comprising:
   an antenna array;
   a transceiver coupled to the antenna array;
   a memory configured to store a codebook including a plurality of precoders;
   a controller coupled to the transceiver and the memory, the controller
      configured to receive a plurality of precoders from the codebook,
      configured to transform each precoder of the plurality of precoders using a transformation that maps each precoder to a transformed precoder such that the transformed precoders generate antenna patterns equal radiated power,
      configured to receive a signal for transmission, and
      configured to apply a transformed precoder of the plurality of transformed precoders to the signal to generate a precoded signal for transmission over a physical channel,
   wherein the transceiver is configured to transmit the precoded signal, and
   wherein a transformation matrix for the transformation is an inverse of a right factor of a factorization of a Hermitian and non-negative definite matrix.

10. The apparatus according to claim 9, wherein the transformation maps each precoder to a transformed precoder such the transformed precoders generate antenna patterns with equal radiated power from the antenna array.

11. The apparatus according to claim 9 wherein the Hermitian and non-negative definite matrix is a function of a source model of the transceiver, a source impedance of the transceiver, and an impedance matrix of the antenna array.

12. The apparatus according to claim 11,
   wherein the transceiver includes a transmitter source, and wherein the transformation comprises:

$$v = P_{Thev}^{-1} w$$

where w is the precoder from the codebook, v is the transformed precoder, and $P_{Thev}$ is based on $$Q_{Thev} = P_{Thev}^H P_{Thev}$$

where $$Q_{Thev} = (Z_{S\_Thev}+Z)^{-H} Re(Z)(Z_{S\_Thev}+Z)^{-1}$$

where $Z_{S\_Thev}$ is a diagonal matrix of the transmitter source impedances and Z is the impedance matrix of the antenna array.

13. The apparatus according to claim 11,
   wherein the transceiver includes a transmitter source, and wherein the transformation comprises:

$$i = P_{Nor}^{-1} w$$

where w is the precoder from the codebook, i is the transformed precoder, and $P_{Nor}$ is based on $$Q_{Nor} = P_{Nor}^H P_{Nor}$$

where $$Q_{Nor} = Z_{S\_Nor}^H (Z_{S\_Nor}+Z)^{-H} Re(Z)(Z_{S\_Nor}+Z)^{-1} Z_{S\_Nor}$$

where $Z_{S\_Nor}$ is a diagonal matrix of the transmitter source impedances and Z is the impedance matrix of the antenna array.

14. The apparatus according to claim 9, wherein the same transformation is applied to data symbol precoders and reference symbol precoders.

15. The apparatus according to claim 9, wherein the controller is configured to apply a transformed precoder by multiplying the transformed precoder by the signal to generate a precoded signal for transmission over a physical channel.

16. The apparatus according to claim 9, wherein the antennas of the array are mutual coupled in that voltage or current applied to one antenna element induces a voltage or current on another antenna element in the antenna array.

17. A method comprising:
    receiving a plurality of precoders from a codebook in a transmitter having an antenna array where the antennas of the array are mutual coupled in that voltage or current applied to one antenna element induces a voltage or current on another antenna element in the antenna array;
    transforming each precoder of the plurality of precoders using a transformation that maps each precoder to a transformed precoder such that the transformed precoders generate antenna patterns with equal radiated power from the antenna array;
    receiving a signal for transmission;
    multiplying the transformed precoder of the plurality of transformed precoders by the signal to generate a precoded signal for transmission over a physical channel; and
    transmitting the precoded signal,
    wherein the same transformation is applied to data symbol precoders and reference symbol precoders, and
    wherein a transformation matrix for the transformation is an inverse of a right factor of a factorization of a Hermitian and non-negative definite matrix.

\* \* \* \* \*